United States Patent [19]

Ikeuchi et al.

[11] Patent Number: 5,076,249
[45] Date of Patent: Dec. 31, 1991

[54] ANGULAR POSITION DETECTOR APPARATUS

[75] Inventors: Masayuki Ikeuchi; Toshiaki Hata, both of Himeji, Japan

[73] Assignee: Mitsubishi Denki Kabushiki Kaisha, Tokyo, Japan

[21] Appl. No.: 368,630

[22] Filed: Jun. 20, 1989

[30] Foreign Application Priority Data

Jun. 22, 1988 [JP] Japan .......................... 63-81661[U]

[51] Int. Cl.$^5$ .................................... F02P 7/073
[52] U.S. Cl. ................................ 123/613; 123/647
[58] Field of Search ............. 123/612, 613, 614, 615, 123/616, 617, 647, 146.5 A

[56] References Cited

U.S. PATENT DOCUMENTS

| | | | |
|---|---|---|---|
| 3,581,725 | 6/1971 | Hemphill et al. | 123/613 |
| 3,820,521 | 6/1974 | Longstaff-Tyrrell | 123/146.5 A |
| 3,888,225 | 6/1975 | Boyer et al. | 123/617 |
| 4,527,535 | 7/1985 | Ito et al. | 123/617 |
| 4,620,522 | 11/1986 | Boyer | 123/617 |
| 4,773,381 | 9/1988 | Koshida | 123/613 |

Primary Examiner—Andrew M. Dolinar
Attorney, Agent, or Firm—Sughrue, Mion, Zinn, Macpeak and Seas

[57] ABSTRACT

An angular position detector mounted within an engine ignition distributor for detecting an angular position of a rotary shaft. The detector comprises a detecting element disposed about the rotary shaft for generating a detection signal corresponding to an angular position of the rotary shaft and a processing circuit disposed around the rotary shaft for processing the detection signal from the detecting element. The detecting element and the processing circuit are connected by an electrical conductor member which is arranged at a position sufficiently remote from the rotary shaft for reducing an undesirable effect of a high voltage which may appear in the rotary shaft.

4 Claims, 2 Drawing Sheets

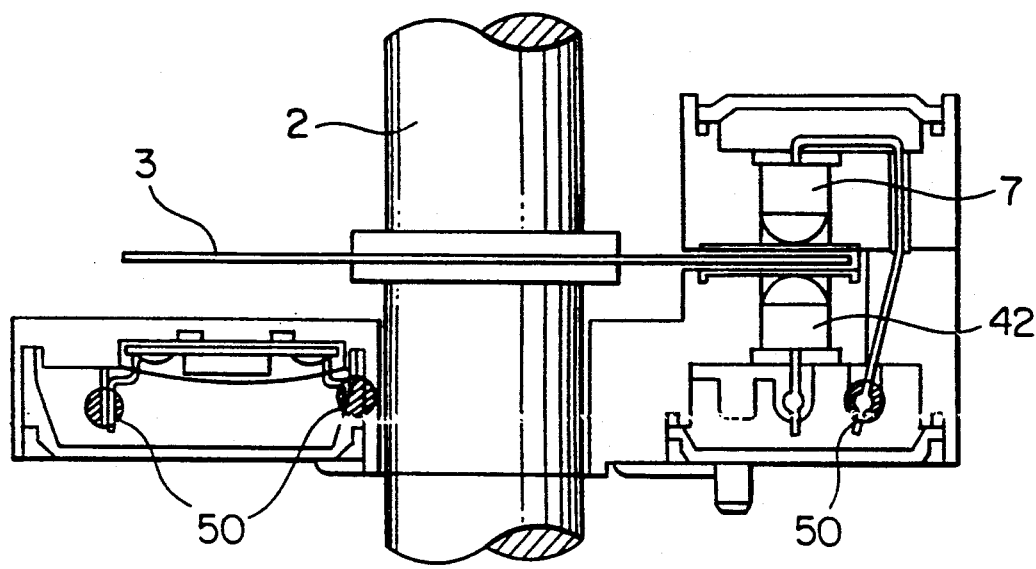
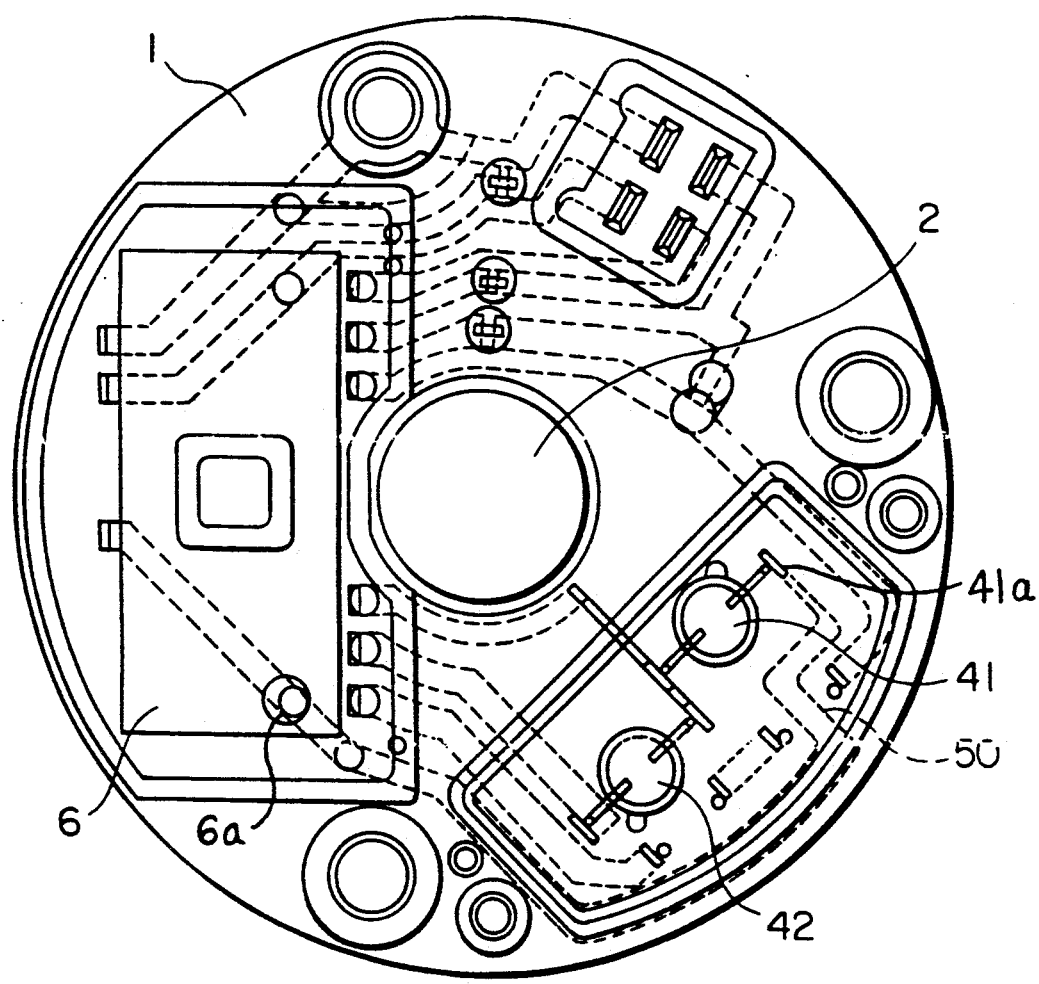

ANGULAR POSITION DETECTOR APPARATUS

BACKGROUND OF THE INVENTION

This invention relates to an angular position detector of a rotary shaft and more particularly to an angular position detector mounted within an engine ignition distributor for detecting an angular position of a rotary shaft.

FIGS. 1 and 2 are schematic views illustrating main portions of one example of an angular position detector apparatus disposed within an engine ignition distributor to which the present invention can be applied. It is seen that a rotary shaft 2 which rotates in synchronization with the unillustrated internal combustion engine is disposed at the center of a housing 1. The rotary shaft 2 has integrally mounted thereon a disc 3 shown in FIG. 2 having two sets of a predetermined number of through holes or apertures 31 and 32 arranged in two arrays along the circumferential direction. In the housing 1 and on one side of the disc 3, two light-emitting elements (not shown) corresponding to the respective arrays of the apertures 31 and 32 are provided, and on the other side of the disc 3, detection elements 41 and 42 such as photo-diodes for generating a detection signal corresponding to the angular position of the rotary shaft 2 in response to the light which has passed through the apertures 31 and 32 are provided. The detection element 41 has an output terminal which is electrically connected by an electrical conductor member 5 to a processing circuit 6 which is made of IC chips, for example.

In the angular position detector as above described, when the disc 3 is driven by the rotary shaft 2 connected to the unillustrated engine, the detection elements 41 and 42 receive intermittent light from the unillustrated light-emitting elements passing through the apertures in the disc 3. Then the angular position of the rotary shaft 2 can be determined by processing the output signals from the detection elements 41 and 42 by the processing circuit 6. The angular position thus obtained may be used as a reference angular position for controlling the engine ignition timing.

In the angular position detector of the above-described construction, the conductor member 5 which is embedded in the cast-molded resin is at a position close to the inner peripheral portion of the housing 1 which is close to the rotary shaft 2. However, the rotary shaft 2 and the disc 3 may have induced therein a high tension voltage due to igniting. Therefore, the angular position detector as above described in which the input signal conducting conductor member 5 which is of a high impedance and a high sensitivity is positioned close to the rotary shaft 2 and is easily undesirably affected by the above-mentioned high tension voltage, resulting in an erroneous operation of the detector.

SUMMARY OF THE INVENTION

Accordingly, the primary object of the present invention is to provide an angular position detector free from the above-discussed problems.

Another object of the present invention is to provide an angular position detector which is reliable and accurate.

Another object of the present invention is to provide an angular position detector which is less sensitive to the high tension voltage induced in the rotary shaft.

With the above objects in view, the angular position detector mounted within an engine ignition distributor for detecting an angular position of a rotary shaft is provided, which comprises a detecting element disposed about the rotary shaft for generating a detection signal corresponding to an angular position of the rotary shaft and a processing circuit disposed around the rotary shaft for processing the detection signal from the detecting element. The detecting element and the processing circuit are connected by an electrical conductor member which is arranged at a position sufficiently remote from the rotary shaft for reducing an undesirable effect of a high tension voltage which may be induced in the rotary shaft.

According to the present invention, since the conductor member is located sufficiently remote from the rotary shaft, the coupling capacitance between the member and the rotary shaft is decreased and the overlapping noise is decreased, thus minimizing the erroneous operation of the angular position detector.

BRIEF DESCRIPTION OF THE DRAWINGS

The present invention will become more readily apparent from the following detailed description of the preferred embodiment of the present invention taken in conjunction with the accompanying drawings, in which:

FIG. 3 is a schematic side view of one embodiment of the angular position detector of the present invention; and FIG. 4 is a schematic plan view of the angular position detector of the present invention with the rotary disc removed.

DESCRIPTION OF THE PREFERRED EMBODIMENT

Figure 2:
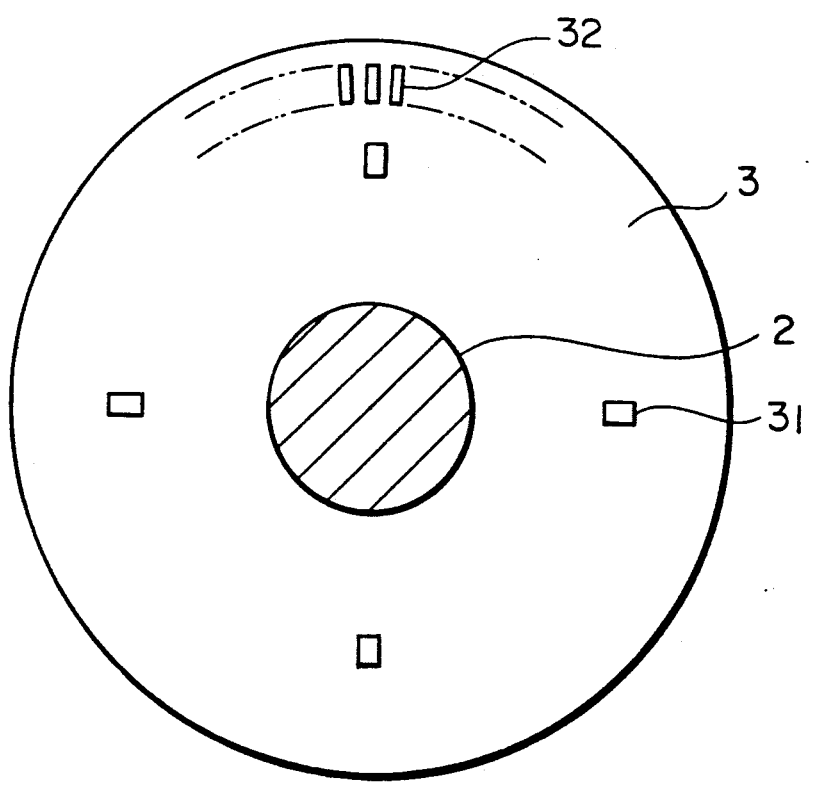
FIG. 2 is a plan view of the rotary disc of the angular position detector shown in FIG. 1.

One embodiment of the present invention will now be described in conjunction with FIGS. 3 and 4 of the drawings. It is seen that a rotary shaft 2 which rotates in synchronization with the unillustrated internal combustion engine is disposed at the center of a housing 1. The rotary shaft 2 has integrally mounted thereon a disc 3 shown in FIGS. 2 and 3 having two sets of a predetermined number of through holes or apertures 31 and 32 arranged in two arrays along the circumferential direction. In the housing 1 and on one side of the disc 3, two light-emitting elements 7 (one of which is not shown) corresponding to the respective arrays of the apertures 31 and 32 are provided, and on the other side of the disc 3, detection elements 41 and 42 such as photo-diodes for generating a detection signal corresponding to the angular position of the rotary shaft 2 in response to the light which has passed through the apertures 31 and 32 are provided. According to the present invention, an output terminal 41a of the detection element 41 is electrically connected by an electrical conductor member 50 to the IC processing circuit 6. It is seen from FIG. 4 that the conductor member 50 of the illustrated embodiment first extends in a generally radially outward direction from the output terminal 41a of the detection element 41 to the outer periphery of the housing 1 where it is bent so that it extends in the circumferential direction for a predetermined length. Then the conductor member 50 is bent radially inwardly toward the processing circuit 6 where it is connected to an input terminal 6a. Thus, it may be said that the conductor member 50 it is located at a position sufficiently remote from the rotary shaft 2, or that it extends without coming close to the rotary shaft 2.

In the angular position detector as above described, when the disc 3 is driven by the rotary shaft 2 connected to the unillustrated engine, the detection elements 41 and 42 receive intermittent light from the light-emitting elements 7 and passing through the apertures 31 and 32 in the disc 3. Then the angular position of the rotary shaft 2 can be determined by processing the output signals supplied through the conductor member 50 from the detection elements 41 and 42 by the processing circuit 6. The angular position thus obtained may be used as a reference angular position for controlling the engine ignition timing.

Figure 1:
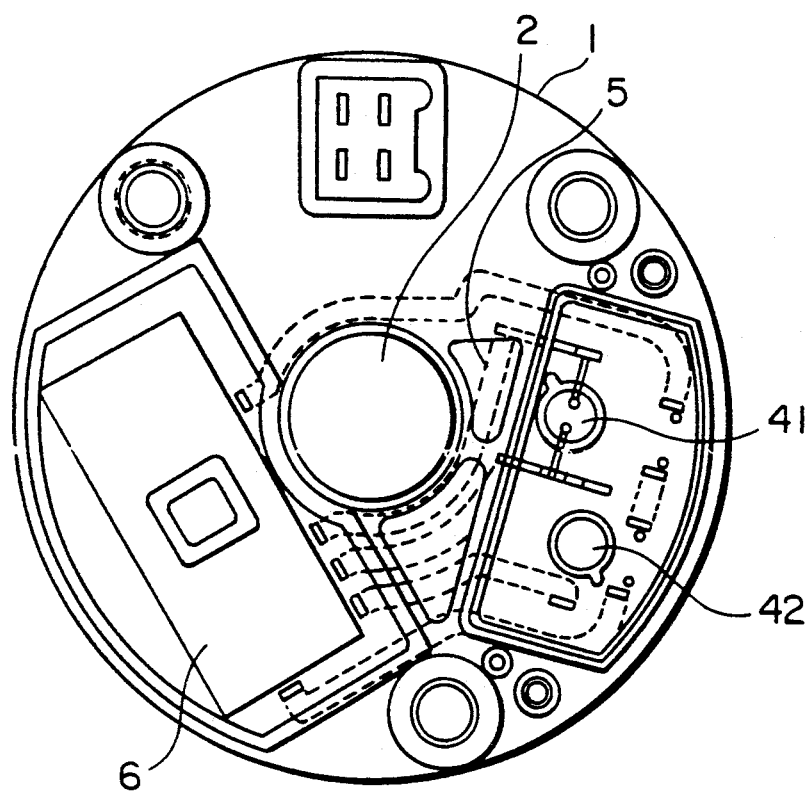
FIG. 1 is a schematic plan view of an angular position detector to which the present invention can be applied with the rotary disc removed.

Thus, the construction of the angular position detector of the present invention is different from that of the detector shown and described in conjunction with FIG. 1 in that the electrical conductor member 50 according to the present invention is arranged at a position sufficiently remote from the rotary shaft 2 for substantially reducing an undesirable effect of a high tension voltage which may appear in the rotary shaft 2.

Since the conductor member 50 of the present invention connecting the detecting element 41 to the processing circuit 6 is located within the housing 1 sufficiently remote from the rotary shaft 2, the coupling capacitance between the conductor member 50 and the rotary shaft 2 is small and the overlapping noise is decreased, thus minimizing the possibility of erroneous operation of the angular position detector and increasing the reliability.

While the light-emitting elements 7 and the light-detecting elements 41 and 42 are used as the detection elements in the above embodiment, other detection elements may be used. Also, the conductor member 50 may not necessarily be embedded within the molded resin.

As has been described according to the present invention, the electrical conductor member electrically connecting the detecting element and the processing circuit is arranged at a position sufficiently remote from the rotary shaft for reducing an undesirable effect on the detection signal of a high voltage which may apear in the rotary shaft. Therefore, the angular position detector is less sensitive to the high tension voltage induced in the rotary shaft and is reliable and accurate.

What is claimed is:

1. An angular position detector mounted within an engine ignition distributor for detecting an angular position of a rotary shaft, comprising:

a rotary disc integrally mounted on said rotary shaft such that said rotary shaft intersects said disc substantially in the center of said rotary disc, said rotary disc having apertures arranged in an array along the circumferential direction of said rotary disc;

a light emitting element disposed about the rotary shaft and corresponding in position to said array of apertures, said light emitting element providing intermittent light through said apertures as said disc is rotated with said rotary shaft;

a light detecting element disposed about the rotary shaft and corresponding in position to said array of apertures such that said light provided through said apertures is detected by said light detecting element, said light detecting element generating a detection signal corresponding to said angular position of the rotary shaft;

a processing circuit disposed around the rotary shaft in a plane which is substantially perpendicular to an axis of said rotary shaft and which extends through a portion of said light detecting element, said processing circuit processing said detection signal from said light detecting element to calculate the angular position of said rotary shaft; and an electrical conductor member electrically connecting said light detecting element and said processing circuit;

said electrical conductor member being arranged at a position sufficiently remote from the rotary shaft for reducing an undesirable effect on the detection signal of a high voltage which may appear in the rotary shaft, said electrical conductor member extending near said plane in a substantially radially outward direction from said light detecting element to an outer peripheral portion of the housing, said electrical conductor member then being bent to extend near said plane in substantially the circumferential direction and then bent substantially radially inwardly toward and connected to said processing circuit.

2. An angular position detector as claimed in claim 1, further comprising:

a second array of apertures arranged along the circumferential direction of said rotary disc at a different position than said first array;

a second light emitting element disposed about the rotary shaft and corresponding in position to said second array of apertures, said second light emitting element providing intermittent light through said second array of apertures as said disc is rotated with said rotary shaft; and a second light detecting element disposed about the rotary shaft and corresponding in position to said second array of apertures such that said light provided through said second array of apertures is detected by said second light detecting element, said second light detecting element generating a detection signal corresponding to said angular position of the rotary shaft.

3. An angular position detector as claimed in claim 1, wherein said angular position calculated by said processing circuit is used as a reference angular position to control engine ignition timing.

4. An angular position detector as claimed in claim 1, wherein said processing circuit is comprised of IC chips.

* * * * *